United States Patent [19]

Stobbs

[11] Patent Number: 5,328,147
[45] Date of Patent: Jul. 12, 1994

[54] TWO STAGE PRESSURE CONTROL VALVE

[75] Inventor: Thomas J. Stobbs, Brookfield, Wis.

[73] Assignee: Applied Power Inc., Butler, Wis.

[21] Appl. No.: 79,182

[22] Filed: Jun. 17, 1993

[51] Int. Cl.$^5$ .................... F16K 31/40; F16K 31/383
[52] U.S. Cl. ........................ 251/30.02; 251/30.03; 251/129.08; 137/454.5
[58] Field of Search ............... 251/30.02, 30.05, 30.03, 251/129.08; 137/491, 454.5

[56] References Cited

U.S. PATENT DOCUMENTS

| 4,305,566 | 12/1981 | Grawunde | 251/30.02 |
| 4,750,704 | 6/1988 | Brundage | 251/30.02 |
| 5,069,420 | 12/1991 | Stobbs et al. | 251/30.02 |

*Primary Examiner*—Arnold Rosenthal
*Attorney, Agent, or Firm*—Quarles & Brady

[57] ABSTRACT

A two stage pressure control valve has a poppet movable toward and away from a valve seat to vary the cross-sectional area of a passageway from an inlet to an outlet. The position of the poppet is dependent in part on the difference in pressure between a fluid pressure at the inlet which exerts an force on the poppet in one axial direction and a control pressure which is produced by a fluid flow from the inlet in a chamber downstream from the inlet and which exerts a force on the poppet in the opposite axial direction. The control pressure is controlled by an electromagnetic coil which can be variably energized to move an armature so as to vary a variable restriction downstream from the control pressure so as to vary the control pressure. A tube extends through and forms an axial sliding seal with the poppet and communicates a flow of fluid from the inlet to the variable restriction and the chamber is positioned adjacent to an exterior surface of the tube. An orifice through a wall of the tube communicates a lumen of the tube with the chamber.

18 Claims, 1 Drawing Sheet

TWO STAGE PRESSURE CONTROL VALVE

FIELD OF THE INVENTION

This invention relates to two stage pressure control valves, and in particular to such a valve specially adapted to control fluid flow in a vehicle suspension damper.

DISCUSSION OF THE PRIOR ART

U.S. Pat. No. 5,069,420 discloses a predecessor of the valve described herein. Referring particularly to the valves described in connection with FIGS. 15 and 16 of U.S. Pat. No. 5,069,420, the two stage proportional pressure control valves described therein have an inlet, an outlet, a valve seat between the inlet and outlet, and a valve poppet which can be moved toward or away from the valve seat to vary the cross section of the passage from the inlet to the outlet so as to vary the flow of fluid from the inlet to the outlet. Fluid from the inlet also flows through the poppet to a chamber behind the poppet which is vented through a variable restriction. The restriction is varied by moving an armature toward or away from it, the armature being propelled by a magnetic field generated by an electromagnetic coil. When the armature is moved away from the restriction, the pressure in the chamber behind the poppet drops, thereby increasing the pressure difference across the poppet. This tends to move the popper away from the seat, increasing flow from the inlet to the outlet. When the armature is moved toward the restriction, the pressure difference across the poppet is reduced, which has the effect of moving the poppet toward the valve seat thereby reducing the flow from the inlet to the outlet.

While the valves described in U.S. Pat. No. 5,069,420 represent significant advances over the prior art, it was found that under certain circumstances, most commonly under low dynamic (changing) flow conditions, the valves could exhibit unstable behavior. Particularly, the poppet would bounce back and forth between open and full closed positions, producing a chattering noise.

SUMMARY OF THE INVENTION

The present invention provides a two stage valve which overcomes the above problem in a design which is economical, efficient and easy to manufacture.

The invention provides a two stage pressure control valve having a poppet movable toward and away from a valve seat to vary the cross-sectional area of a passageway from an inlet to an outlet. The position of the poppet is dependent in large part on the difference in pressure between a fluid pressure at the inlet which exerts a force on the poppet in one axial direction and a control pressure which is produced by a fluid flow from the inlet in a chamber downstream from the inlet and which exerts a force on the poppet in the opposite axial direction. The control pressure is controlled by an electromagnetic coil which can be variably energized to move an armature so as to vary a variable restriction downstream from the control pressure, or hold the armature against the restriction with a variable force, so as to balance against the control pressure, thereby controlling the pressure differential across the main poppet. In the invention, the chamber is in communication with the variable restriction through at least one orifice upstream of the variable restriction. The orifice prevents rapid changes in the pressure inside the chamber so as to damp the chamber pressure, and therefore damp movements of the poppet. In this way, the unstable chattering response of the prior valve under certain flow conditions is eliminated.

In preferred forms of the invention, one or more additional orifices are provided in the flow path from the inlet to the variable restriction. Preferably, the chamber orifice opens into an unrestricted passageway fed by an upstream orifice which is in communication with the inlet and depleted by a downstream orifice which is in communication with the variable restriction. In this manner, the upstream and downstream orifices are in direct communication with one another and the chamber orifice does not interfere with and is independent of the direct communication between the upstream and downstream orifices.

In an especially preferred form, fluid is channeled from the inlet to the variable restriction through a tube which extends through the poppet, the chamber being defined adjacent to an outer surface of the tube. The orifice extends through a wall of the tube between a lumen of the tube and the chamber, and the tube and popper form a sliding seal with one another. This represents an extremely efficient and cost effective design, since the tube both provides communication between the inlet and variable restriction, but also defines the chamber orifice and helps define the chamber.

DETAILED DESCRIPTION OF THE PREFERRED EMBODIMENTS

Figure 1:
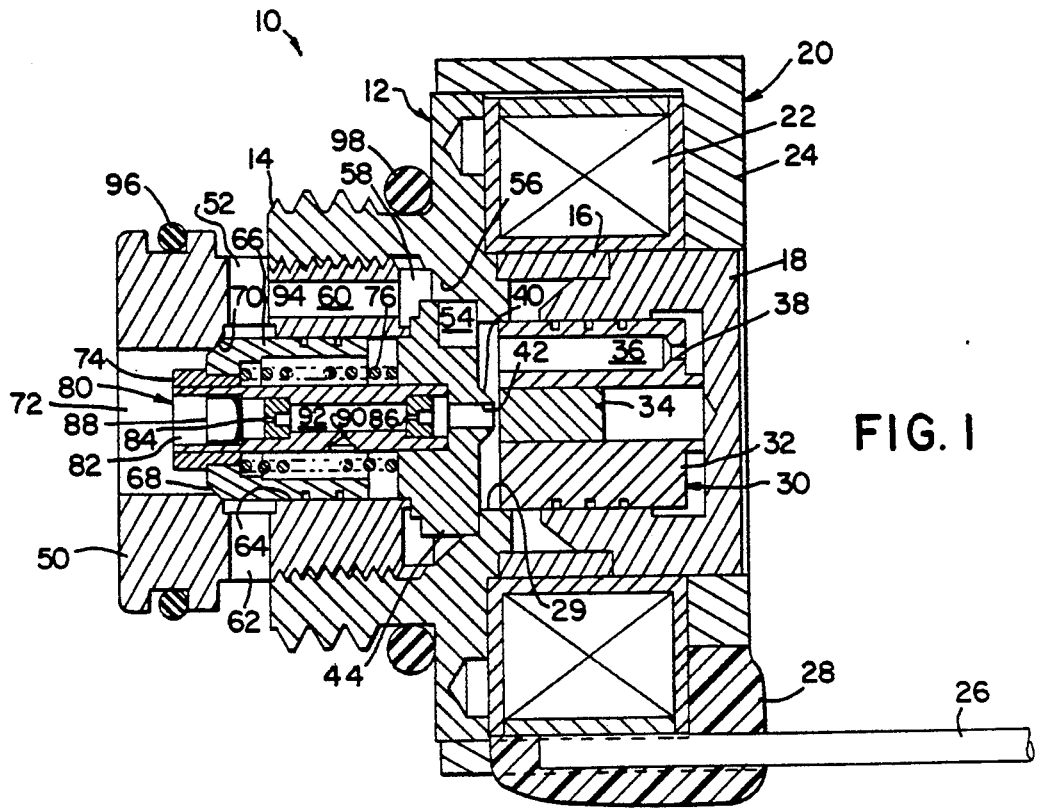
FIG. 1 is a sectional view of a valve of the invention.

A valve 10 of the invention is particularly, although not necessarily, adapted for incorporation into a suspension damper in the same manner as the valve 500 or 600 described in U.S. Pat. No. 5,069,420, the disclosure of which is hereby incorporated by reference. The valve 10 is not limited to this application, however, and could be applied to a wide variety of other applications such as, for example, a pump control circuit, a fan control circuit or a system relief valve.

The valve 10 includes a body subassembly 12 having a steel body 14 brazed to one side of a stainless steel ring 16 and a steel cap 18 brazed to the opposite side of the ring 16. The body subassembly 12 defines an exterior cylindrical surface onto which is pressed an electromagnetic coil subassembly 20 having a coil 22 and a cover 24. Leads 26 of the coil exit the coil subassembly 20 through the cover 24 and are secured in the coil subassembly 20 by potting compound or plastic overmolding 28.

The body subassembly 12 also defines an internal cylindrical armature bore 29 in which an armature 30 is received to slide axially. The armature 30 includes a steel body 32 plugged with a stainless steel pin 34 which is pressed into a bore of the body 32. A passageway 36 extends axially through the armature body 32 to equalize the pressures acting on the opposed axial sides of the armature 30. The passageway 36 terminates in an orifice 38 which helps restrict rapid flows between the opposed axial sides of the armature 30.

Pin 34 is positioned to seat against a nozzle 40 formed around an aperture 42 in a steel nozzle plate 44. The direction of flow through the aperture 42 is from the aperture 42 toward the armature 30. In the valve 10 illustrated, the armature 30 is not biased against the nozzle 40. Therefore, the aperture 42 is normally open. Note however, that the invention could be practiced with an armature 30 which was normally closed, for example, by being biased against the nozzle 40 by a spring. In that case, the configuration of parts could be changed so that an increase in current would tend to move the armature 30 away from the nozzle 40.

The coil 22 is energized via leads 26 to force the armature 30 toward the nozzle 40 so as to vary the restriction through the aperture 42 formed between the nozzle 40 and the pin 34. The greater the current supplied through the coil 22, the greater is the force exerted on the armature 30 toward the nozzle 40, which tends to reduce the flow rate through the aperture 42.

The nozzle plate 40 is secured in a cylindrical bore of the body 14 by a lower body 50 which is screwed into the body 14 and seats against the nozzle plate 44, holding the nozzle plate 44 in position. The lower body 50 defines an outlet port 52 which is in communication via passageways 54, 56, 58 and 60 with the armature bore 29.

The outlet port 52 and outlet port 62 (multiple outlet ports may be provided spaced around the circumference of body 50) opens into the side of a poppet bore 64 formed in the body 14. A cup-shaped poppet 66 is received in the poppet bore 64 for axial sliding relative thereto and has a forward frusto-conical exterior surface 68. The surface 68 is for seating against a mating interior frusto-conical surface 70 formed on the body 14 positioned upstream of outlet 52 and downstream of inlet port 72. Both the poppet 66 and the armature body 32 have circumferential grooves as shown to help balance pressures generated by fluid leakage past the circumferences of the respective poppet 66 and armature body 32, as is well known in the art.

The poppet 66 is made of steel and a brass bushing is pressed into a bore at the inlet end of the poppet 66 so as to create a fluid-tight fixed connection between the bushing 74 and the poppet 66. A compression spring 76 extends between the interior surface of the forward wall of the poppet 66 and the nozzle plate 44. The spring 76 biases the poppet 66 against surface 70 so that the flow path between the inlet 72 and the outlet 52 is normally closed.

Figure 2:
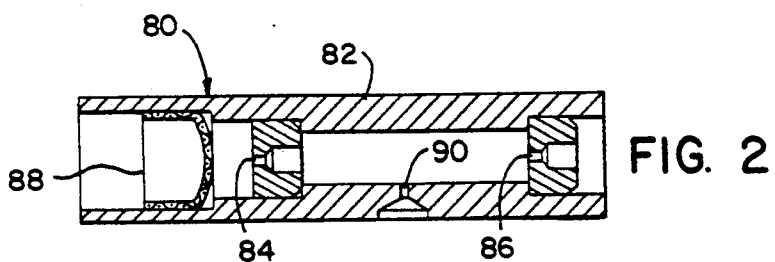
FIG. 2 is an enlarged sectional view of an orifice tube assembly for the valve of FIG. 1.

An orifice tube assembly 80 (FIG. 2) includes a steel tube 82 which is pressed into a forward facing bore of nozzle plate 44 so as to create a fluid-tight fixed connection between the tube 82 and the plate 44. A forward orifice 84 and a rearward orifice 86 are formed in respective orifice inserts which are pressed into the tube 82 so as to create a fluid tight seal between the respective orifice insert and the tube 82. A filter screen 88 is pressed into the tube 82 upstream of the forward orifice 84. The forward end of the tube 82 is received in the brass bushing 74 in a close sliding fit so as to create a substantially fluid-tight seal between the brass bushing 74 and the tube 82 but allow sliding of the poppet 66 relative to the orifice tube assembly 80.

Downstream of forward orifice 84 and upstream of rearward orifice 86, an orifice 90 is formed in the wall of the tube 82 which communicates lumen 92 of tube 82 with chamber 94 defined around the exterior surface of tube 82, in which spring 76 resides. Fluid pressure in chamber 94 tends to urge poppet 66 toward seat 70 such that poppet 66 normally closes the passage between inlet 72 and the outlets 52, 62.

The chamber 94 is defined by the area of the poppet bore 64 exposed in the chamber 94, the exterior cylindrical surface of tube 82, and the interior surfaces of nozzle plate 44 and poppet 66 which are exposed in chamber 94. Except for leakage which may occur between the poppet 66 and the poppet bore 64 and between the brass bushing 74 and the tube 82, which is negligible, the only passageway for fluid into or out of the chamber 94 is the orifice 90.

In the preferred embodiment of the three orifices 84, 86 and 90, the orifice 90 is the smallest, in the preferred embodiment being 0.0098 inches in diameter. In the preferred embodiment, the orifice 84 is 0.0118 inches in diameter and the orifice 86 is 0.0156 inches in diameter. Thus, the forward orifice 84 is capable of delivering a larger flow rate than the orifice 90, and the orifice 86 is capable of delivering a larger flow rate than either the orifice 84 or the orifice 90, for a given pressure differential.

The orifice 90 is sufficiently small so as to restrict relatively rapid flows into or out of the chamber 94. This has the effect of damping the pressure in chamber 94 so that for rapid changes in the pressure at inlet 72, the pressure in chamber 94 changes more slowly. Thus, the movement of poppet 66 is damped, eliminating instability and resultant chattering of the valve 10.

O-rings 96 and 98 are provided to provide sealed interfaces with the manifold of the system into which the valve 10 is incorporated such as, for example, with the valve cavity of the suspension damper as described in U.S. Pat. No. 5,069,420 referred to above.

Upon an increase in pressure at inlet 72, poppet 66 may initially open allowing relief of the pressure to outlet 52 at least until the fluid from inlet 72 flows through orifice 84 and 90 and fills chamber 94 helping to balance the pressure forces acting on the poppet. When the pressure forces acting on the poppet are balanced, which is the case when the pressure at inlet port 72 equals the pressure in chamber 94, spring 76 holds the popper 66 closed, holding the poppet 66 in abutment with seat 70. This is the case when the coil 22 is hard on, so that the stainless steel pin 34 is seated against nozzle 40, completely closing off flow through aperture 42.

When the current through coil 22 is reduced so as to allow aperture 42 to open, fluid flows through orifice 86 and escapes through aperture 42, armature bore 29 and passages 60, 58, 56 and 54 to the outlet 52. This reduces the pressure in lumen 92 which correspondingly causes fluid to flow toward orifice 86 through orifices 84 and 90. As oil flows through orifice 90, the volume of chamber 94 is reduced as poppet 66 moves away from seat 70, which correspondingly reduces the pressure at inlet 72 until the pressure at inlet 72 reaches a reduced steady state value, exerting a force on the poppet 66 equal to the force exerted on the poppet 66 by the spring 76 and the pressure within chamber 94. It should also be noted that there would be a Bernoulli force exerted by the fluid flowing from the inlet 72 to the outlet 52 which tends to close the poppet 66, as is well-known in the art, and that this explanation ignores friction forces, which are negligible.

Should the pressure at inlet port 72 change rapidly, although the pressure in lumen 92 may also change rapidly, the pressure in chamber 94 will not change as rapidly since the orifice 90 will slow the flow of fluid to or from the chamber 94. Thus, orifice 90 damps pressure changes in the chamber 94 and therefore damps movements of the poppet 66.

Figure 3:
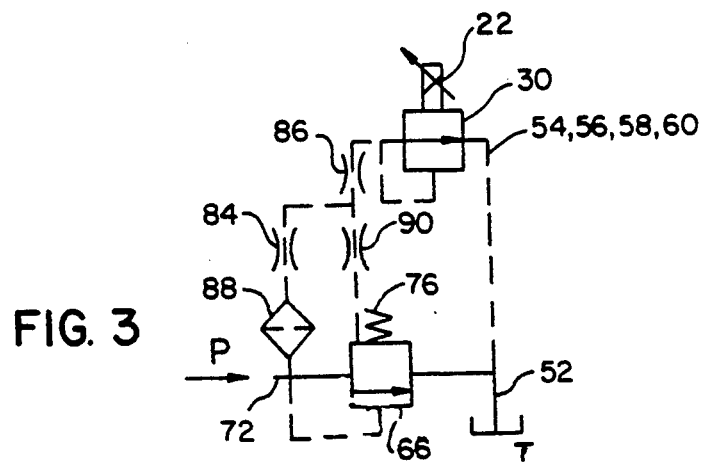
FIG. 3 is a hydraulic schematic diagram of the valve of FIG. 1.

FIG. 3 illustrates a schematic diagram of the valve 10. Elements shown in the schematic of FIG. 3 are labeled with the same reference numerals as were used for the same elements in FIGS. 1 and 2.

Preferred embodiments of the invention have been described in considerable detail. Numerous modifications and variations to the preferred embodiments will be apparent to those of ordinary skill in the art, but will still incorporate the spirit of the invention. For example, the tube 82 could be fixed to the poppet 66 and form an axially sliding seal with the nozzle plate 44. Therefore, the invention should not be limited to the scope of the preferred embodiments described, but should be defined by the claims which follow.

I claim:

1. In a two stage pressure control valve of the type having a fluid inlet, a fluid outlet, a valve seat between said inlet and outlet, a poppet movable toward and away from said seat to vary the cross-sectional area of a passageway from said inlet to said outlet, the position of said poppet being dependent in part upon the difference in pressure between a fluid pressure at said inlet which exerts a force on said poppet in one axial direction and a control pressure produced by a fluid flow from said inlet in a chamber which varies in volume as said poppet moves axially, said control pressure exerting a force on said poppet in an axial direction opposite from said one axial direction, said control pressure being controlled by an electromagnetic coil which can be variably energized to move an armature so as to vary a variable restriction downstream from said control pressure so as to vary said control pressure, an improvement wherein said variable restriction is formed by said armature and a valve seat, said armature having an axially facing surface which is movable toward or away from said valve seat to vary said variable restriction and said chamber is in communication with said variable restriction through at least one orifice upstream of said variable restriction.

2. In a two stage pressure control valve of the type having a fluid inlet, a fluid outlet, a valve seat between said inlet and outlet, a poppet movable toward and away from said seat to vary the cross-sectional area of a passageway from said inlet to said outlet, the position of said poppet being dependent in part upon the difference in pressure between a fluid pressure at said inlet which exerts a force on said poppet in one axial direction and a control pressure produced by a fluid flow from said inlet in a chamber which varies in volume as said poppet moves axially, said control pressure exerting a force on said poppet in an axial direction opposite from said one axial direction, said control pressure being controlled by an electromagnetic coil which can be variably energized to move an armature so as to vary a variable restriction downstream from said control pressure so as to vary said control pressure, an improvement wherein said chamber is in communication with said variable restriction through at least one orifice upstream of said variable restriction and said orifice opens into an unrestricted passageway which is fed by an upstream orifice in communication with the inlet and depleted by a downstream orifice in communication with the variable restriction.

3. The improvement of claim 1, wherein said chamber is separated from said variable restriction by at least two orifices.

4. In a two stage pressure control valve of the type having a fluid inlet, a fluid outlet, a valve seat between said inlet and outlet, a poppet movable toward and away from said seat to vary the cross-sectional area of a passageway from said inlet to said outlet, the position of said poppet being dependent in part upon the difference in pressure between a fluid pressure at said inlet which exerts a force on said poppet in one axial direction and a control pressure produced by a fluid flow from said inlet in a chamber which varies in volume as said poppet moves axially, said control pressure exerting a force on said poppet in an axial direction opposite from said one axial direction, said control pressure being controlled by an electromagnetic coil which can be variably energized to move an armature so as to vary a variable restriction downstream from said control pressure so as to vary said control pressure, an improvement wherein said chamber is in communication with said variable restriction through at least one orifice upstream of said variable restriction and said chamber is closed except for one orifice.

5. In a two stage pressure control valve of the type having a fluid inlet, a fluid outlet, a valve seat between said inlet and outlet, a poppet movable toward and away from said seat to vary the cross-sectional area of a passageway from said inlet to said outlet, the position of said poppet being dependent in part upon the difference in pressure between a fluid pressure at said inlet which exerts a force on said poppet in one axial direction and a control pressure produced by a fluid flow from said inlet in a chamber which varies in volume as said poppet moves axially, said control pressure exerting a force on said poppet in an axial direction opposite from said one axial direction, said control pressure being controlled by an electromagnetic coil which can be variably energized to move an armature so as to vary a variable restriction downstream from said control pressure so as to vary said control pressure, an improvement wherein said chamber is in communication with said variable restriction through at least one orifice upstream of said variable restriction and fluid flowing from said inlet to said variable restriction is bypassed into said chamber by said orifice.

6. In a two stage pressure control valve of the type having a fluid inlet, a fluid outlet, a valve seat between said inlet and outlet, a poppet movable toward and away from said seat to vary the cross-sectional area of a passageway from said inlet to said outlet, the position of said poppet being dependent in part upon the difference in pressure between a fluid pressure at said inlet which exerts a force on said poppet in one axial direction and a control pressure produced by a fluid flow from said inlet in a chamber which varies in volume as said poppet moves axially, said control pressure exerting a force on said poppet in an axial direction opposite from said one axial direction, said control pressure being controlled by an electromagnetic coil which can be variably energized to move an armature so as to vary a variable restriction downstream from said control pressure so as to vary said control pressure, an improvement wherein said chamber is in communication with said variable restriction through at least one orifice upstream of said variable restriction and fluid from said inlet is admitted into said chamber through a first orifice and a second orifice downstream of said first orifice.

7. The improvement of claim 6, wherein fluid is exhausted from said chamber to said variable restriction through said second orifice.

8. The improvement of claim 7, wherein fluid which has been exhausted from said chamber through said second orifice flows through a third orifice which is downstream of said second orifice and upstream of said variable restriction.

9. The improvement of claim 8, wherein the first and third orifices are in direct communication with one another, said second orifice opening between said first and third orifices, fluid flowing from said first orifice to said third orifice being able to bypass said second orifice.

10. The improvement of claim 8, wherein said first orifice is larger than said second orifice.

11. The improvement of claim 8, wherein said third orifice is larger than said first orifice.

12. In a two stage pressure control valve of the type having a fluid inlet, a fluid outlet, a valve seat between said inlet and outlet, a poppet movable toward and away from said seat to vary the cross-sectional area of a passageway from said inlet to said outlet, the position of said poppet being dependent in part upon the difference in pressure between a fluid pressure at said inlet which exerts a force on said poppet in one axial direction and a control pressure produced by a fluid flow from said inlet in a chamber which varies in volume as said poppet moves axially, said control pressure exerting a force on said poppet in an axial direction opposite from said one axial direction, said control pressure being controlled by an electromagnetic coil which can be variably energized to move an armature so as to vary a variable restriction downstream from said control pressure so as to vary said control pressure, an improvement wherein said chamber is in communication with said variable restriction through at least one orifice upstream of said variable restriction and fluid is channeled from said inlet to said variable restriction through a tube which extends through said poppet, said chamber being defined adjacent to an outer surface of said tube.

13. The improvement of claim 12, wherein said orifice extends through a wall of said tube between a lumen of said tube and said chamber.

14. The improvement of claim 12, wherein said tube and poppet form a sliding seal with one another.

15. The improvement of claim 14, wherein said tube is fixed to a plate in which an aperture of said variable restriction is formed.

16. In a two stage pressure control valve of the type having a fluid inlet, a fluid outlet, a valve seat between said inlet and outlet, a poppet movable toward and away from said seat to vary the cross-sectional area of a passageway from said inlet to said outlet, the position of said poppet being dependent in part upon the difference in pressure between a fluid pressure at said inlet which exerts an force on said poppet in one axial direction and a control pressure produced by a fluid flow from said inlet in a chamber which varies in volume as said poppet moves axially, said control pressure exerting a force on said poppet in an axial direction opposite from said one axial direction, said control pressure being controlled by an electromagnetic coil which can be variably energized to move an armature so as to vary a variable restriction downstream from said control pressure so as to vary said control pressure, an improvement wherein a tube extends through said poppet for communicating a flow of fluid from said inlet to said variable restriction and said chamber is positioned adjacent to an exterior surface of said tube.

17. The improvement of claim 16, wherein an orifice through a wall of said tube communicates a lumen of said tube with said chamber.

18. The improvement of claim 16, wherein said poppet and said tube form an axially sliding seal with one another.

* * * * *